United States Patent
Mori et al.

(10) Patent No.: US 6,797,770 B1
(45) Date of Patent: Sep. 28, 2004

(54) COATING COMPOSITION CAPABLE OF FORMING ALKALI-SOLUBLE LUBRICATING FILM SUITABLE FOR FORMING AND USE THEREOF

(75) Inventors: Yoichiro Mori, Futtsu (JP); Makoto Yamasaki, Futtsu (JP); Masahiro Fuda, Kitakyushu (JP); Ryosuke Wake, Futtsu (JP); Tsutomu Tawa, Osaka (JP); Chikako Kouda, Osaka (JP); Fumiaki Hirata, Osaka (JP)

(73) Assignees: Nippon Steel Corporation, Tokyo (JP); Mitsui Takeda Chemicals, INC, Tokyo (JP)

( * ) Notice: Subject to any disclaimer, the term of this patent is extended or adjusted under 35 U.S.C. 154(b) by 0 days.

(21) Appl. No.: 09/914,112
(22) PCT Filed: Feb. 25, 2000
(86) PCT No.: PCT/JP00/01127
§ 371 (c)(1),
(2), (4) Date: Oct. 31, 2001
(87) PCT Pub. No.: WO00/50526
PCT Pub. Date: Aug. 31, 2000

(30) Foreign Application Priority Data

Feb. 26, 1999 (JP) .......................................... 11/049530
Dec. 20, 1999 (JP) .......................................... 11/360476

(51) Int. Cl.$^7$ .............................. C08J 3/00; C08K 3/20; C08L 75/00; B05D 3/02; B32B 27/40
(52) U.S. Cl. ................. 524/591; 427/372.2; 427/385.5; 428/423.1; 428/425.8; 524/507; 524/839; 524/840
(58) Field of Search ................................. 524/591, 839, 524/840, 507; 428/423.1, 425.8; 427/385.5, 372.2

(56) References Cited

FOREIGN PATENT DOCUMENTS

| JP | 5-255587 | | 10/1993 |
|---|---|---|---|
| JP | 6-145559 | | 5/1994 |
| JP | 8-127735 | | 5/1996 |
| JP | 8-156177 | | 6/1996 |
| JP | 8-252887 | | 10/1996 |
| JP | 10-88364 | | 4/1998 |
| JP | 10-109376 | * | 4/1998 |
| JP | 10-114014 | | 5/1998 |

OTHER PUBLICATIONS

Patent Abstracts of Japan, vol. 1998, No. 14, Dec. 31, 1998 (JP 10 237478).
Patent Abstracts of Japan, vol. 1998, No. 1, Jan. 30, 1998 (JP 09 254312).
Patent Abstracts of Japan, vol. 1995, No. 11, Dec. 26, 1995 (JP 07 228828).
Patent Abstracts of Japan, vol. 018, No. 517, Sep. 29, 1994 (JP 06 173037).

* cited by examiner

*Primary Examiner*—Patrick D. Niland
(74) *Attorney, Agent, or Firm*—Kenyon & Kenyon

(57) ABSTRACT

A coating composition capable of forming an alkali-soluble lubricating film, which contains as main components an aqueous polyurethane composition (A) and a lubricating functionality-providing agent (B) at 1–30 wt % with respect to the solid content of the aqueous polyurethane composition, having excellent press moldability and scratch resistance, as well as lubricating surface treated metal articles with excellent press moldability and scratch resistance, that are coated with the coating composition to a dry film thickness of 0.5–5 µm. The coating composition preferably further contains as a main component silica particles (C) in an amount of 1–30 wt % with respect to the solid content of the aqueous polyurethane composition.

24 Claims, 1 Drawing Sheet

COATING COMPOSITION CAPABLE OF FORMING ALKALI-SOLUBLE LUBRICATING FILM SUITABLE FOR FORMING AND USE THEREOF

TECHNICAL FIELD

The present invention relates to a coating composition capable of forming an alkali-soluble lubricating film suitable for shape working, to lubricating surface treated metal articles coated with the coating composition, and to a process for production of metal articles that are coated with the coating composition and shape worked.

BACKGROUND ART

Working processes such as press molding of steel sheets have conventionally been carried out while applying lubricating oils, and the like, for the purpose of preventing scratches to the steel sheet surface and molding die surface that occur due to lack of lubrication. This has not only complicated the production process and impaired the working environment, but has necessitated lubricant removal using solvents such as fluon, trichloroethane, dichloromethane and the like in the degreasing step after press molding; such solvents are undesirable from the standpoint of worker health and the environment.

Much study has therefore been prompted by the desire to provide lubricating, surface-treated metal articles capable of being press molded into desired shapes without using such solvents. There have been developed non-strippable lubricant films exhibiting workability, corrosion resistance, solvent resistance, etc. as lubricant films that remain even after press molding, and strippable lubricant films wherein the lubricant films are dissolved and degreased during the alkali degreasing step after press molding. Alkali-strippable lubricating films are used to bring out attractive metal surfaces and for purposes that require weldability after working.

In Japanese Unexamined Patent Publication HEI No. 8-156177, No. 8-252887 and No. 10-114014 there have been proposed alkali-strippable lubricating films employing acrylic-based resins. However, alkali-strippable lubricating films employing acrylic-based resins often fail to offer adequate shapeability, as they undergo scratching under severe press molding conditions such as deep drawing or wipe working.

It is an object of the present invention to solve the problems mentioned above by providing a coating composition with excellent press moldability and scratch resistance, which can form alkali-soluble lubricating films suitable for shape working, as well as lubricating surface treated metal articles coated with the coating composition.

DISCLOSURE OF THE INVENTION

The present inventors have conducted much diligent research aimed at solving the aforementioned problems and obtaining a coating composition with excellent press moldability and scratch resistance, which can form alkali-soluble lubricating films suitable for shape working, as well as lubricating surface treated metal articles. As a result they have completed the present invention upon finding that this object can be achieved by a coating composition comprising an aqueous polyurethane composition and a lubriction functionality-providing agent.

Specifically, the coating composition capable of forming an alkali-soluble lubricating film according to the invention (1) is characterized in that it contains as main components an aqueous polyurethane composition (A) and a lubricating functionality-providing agent (B) at 1–30 wt % with respect to the solid content of the aqueous polyurethane composition, and in that the coating composition is film-formable and its formed films are alkali-soluble. This coating composition (1) that comprises an aqueous polyurethane composition (A) and a lubricating functionality-providing agent (B) exhibits sufficient lubricating properties and ground layer protection even under severe shape working conditions such as press working, deep drawing, wipe working and roll forming.

The coating composition capable of forming an alkali-soluble lubricating film according to the invention (2) is characterized in that it contains, in addition to the aqueous polyurethane composition (A) and the lubricating functionality-providing agent (B), also silica particles (C) at 1–30 wt % with respect to the solid content of the aqueous polyurethane composition.

The coating composition capable of forming an alkali-soluble lubricating film according to the invention (3) is a coating composition according to (1) or (2) above characterized in that the aqueous polyurethane composition (A) comprises a polyester polyol. This aqueous polyurethane composition (A) that comprises a polyester polyol can easily provide the alkali solubility required for the invention.

The coating composition capable of forming an alkali-soluble lubricating film according to the invention (4) is a coating composition according to (1) or (2) above characterized in that the aqueous polyurethane composition (A) contains a carboxyl group or sulfonic acid group, or a salt thereof, as a hydrophilic group. The aqueous polyurethane composition (A) wherein the hydrophilic group is a carboxyl group or sulfonic acid group or a salt thereof can exhibit excellent adhesion with metal sheet surfaces, and provide adequate shapeability under severe press molding conditions such as deep drawing and wipe working.

The coating composition capable of forming an alkali-soluble lubricating film according to the invention (5) is a coating composition according to (1) or (2) above characterized in that the hydrophilic group of the aqueous polyurethane composition (A) is a Na salt or K salt of a carboxyl group or sulfonic acid group. The carboxyl group or sulfonic acid group as the hydrophilic group of the aqueous polyurethane composition (A) is neutralized by the Na or K to achieve a satisfactory stripping property with alkali degreasing agents.

The coating composition capable of forming an alkali-soluble lubricating film according to the invention (6) is a coating composition according to (1) or (2) above characterized in that the carboxyl group or sulfonic acid group as the hydrophilic group of the aqueous polyurethane composition (A), or its salt, is included to an acid value in the range of 25–180. The aqueous polyurethane composition (A) wherein the carboxyl group or sulfonic acid group as the hydrophilic group, or its salt, is included to an acid value in the range of 25–180, provides a satisfactory stripping property with alkali degreasing agents even at room temperature.

The coating composition capable of forming an alkali-soluble lubricating film according to the invention (7) is a coating composition according to (3) above characterized in that the polyester polyol in the aqueous polyurethane composition (A) is prepared by reacting ethylene glycol with an aliphatic dibasic acid or its dialkyl ester, or a mixture thereof. The aqueous polyurethane composition (A) comprising a polyester polyol composed of ethylene glycol and a dicarboxylic acid can easily provide the alkali solubility required for the invention even at lower temperatures such as room temperature.

The coating composition capable of forming an alkali-soluble lubricating film according to the invention (8) is a coating composition according to (1) or a coating composition according to (2) above characterized in that the hydrophilic group of the aqueous polyurethane composition (A) is a carboxyl group or sulfonic acid group, or a salt thereof. The aqueous polyurethane composition (A) wherein the hydrophilic group is a carboxyl group or sulfonic acid group or salt thereof can exhibit excellent adhesion with metal sheet surfaces, and provide adequate shapeability under severe press molding conditions such as deep drawing and wipe working.

The coating composition capable of forming an alkali-soluble lubricating film according to the invention (6) is a coating composition according to (1) to (5) above, characterized in that the lubricating functionality-providing agent (B) comprises one or more from among polyolefin-based waxes, fluorine-based waxes, paraffin-based waxes and stearic acid-based waxes. The lubricating surface treated metal articles of the invention are steel sheets with excellent press moldability and scratch resistance, characterized by being coated with any of the aforementioned coating compositions to a dry film thickness of 0.5–5 μm.

According to the invention there are provided surface treated metal articles obtained by coating metal surfaces with the aforementioned coating compositions capable of forming alkali-soluble lubricating films, and a process for production of metal articles involving shape working of such surface treated metal articles.

Specifically, a lubricating surface treated metal article according to the invention is characterized in that a lubricating film comprising a polyurethane resin (A') and a lubricating functionality-providing agent (B) at 1–30 wt % with respect to the polyurethane resin, is formed on the surface of a metal article, wherein the lubricating film is alkali soluble and the film thickness is 0.5–5 μm.

The process for production of metal articles according to the invention is characterized by comprising i) a step of coating the surface of a metal article with a coating composition containing an aqueous polyurethane composition (A) and a lubricating functionality-providing agent (B) at 1–30 wt % with respect to the solid content of the aqueous polyurethane composition (A), the aqueous polyurethane composition being film-formable and the formed film being alkali soluble, to form an alkali-soluble lubricating film, ii) a step of shape working the metal article surface treated with the alkali-soluble lubricating film, and iii) a step of treating the shape worked metal article with an alkali to remove the alkali-soluble lubricating film.

BEST MODE FOR CARRYING OUT THE INVENTION

Figure 1:
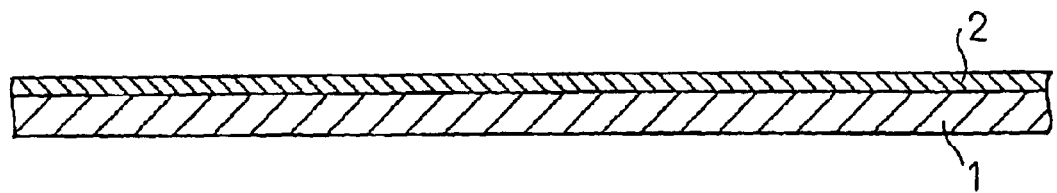
FIGS. 1 to 3 are illustrations of a process in which a coating composition capable of forming an alkali-soluble lubricating film according to the invention is coated onto a steel sheet surface, the lubricating film-formed steel sheet is shape worked and the lubricating film is then removed.

The invention will now be explained in further detail.

As a result of diligent research on a coating composition that exhibits adequate shapeability under severe press molding conditions such as deep drawing or wipe working and that forms alkali-soluble lubricating films which can be dissolved and degreased in an alkali degreasing step after press molding, and on lubricating surface treated metal articles coated with the coating composition, the present inventors have determined that a coating composition comprising an aqueous polyurethane composition and a lubricating functionality-providing agent is able to provide this desired performance.

The aqueous polyurethane composition of the invention is prepared by dissolving or dispersing in water a polyurethane resin obtained by reacting a compound having at least two active hydrogen groups per molecule with a compound having at least two isocyanate groups per molecule. An advantageous reaction method is one in which a compound having two active hydrogen groups is reacted with a compound having at least two isocyanate groups per molecule, under an excess of isocyanate groups in terms of the ratio of isocyanate groups to active hydrogen groups (NCO groups/OH groups), to first prepare an isocyanate group-containing polyurethane prepolymer, dissolving or dispersing this in water, and then reacting it with a chain extender such as a polyamine compound to produce a higher molecular weight polymer. For preparation of the polyurethane prepolymer, the ratio of the isocyanate groups and active hydrogen groups is preferably 1.1–3.0, and more preferably 1.2–2.0.

The molecular weight of the polyurethane resin in the aqueous polyurethane composition of the invention is, for example, a weight average molecular weight of 10,000–1,000,000, and preferably 50,000–500,000. Thus, the molecular weight of the polyurethane resin film obtained from the aqueous polyurethane composition of the invention is the same.

First, the compound having at least two active hydrogen groups per molecule will be explained.

As compounds having at least two active hydrogen groups per molecule there may be mentioned, for example, compounds with groups having an active hydrogen, such as amino groups, hydroxyl groups and mercapto groups, but in consideration of the reaction rate with the isocyanate groups and the mechanical properties after coating, compounds with hydroxyl groups are preferred. The number of functional groups in the compound having active hydrogen groups is preferably 2–6, and especially 2–4, from the standpoint of satisfactorily supporting the mechanical properties of the coating.

The molecular weight of the compound having active hydrogen groups is preferably 200–10,000, and especially 300–5000, from the standpoint of the final density of urethane bonds contributing to the coating performance and the workability during production.

As examples of compounds wherein the active hydrogen groups are hydroxyl groups there may be mentioned polyester polyols, polyether polyols, polyether ester polyols, polyesteramide polyols, acryl polyols, polycarbonate polyols, polyhydroxyalkanes, castor oil, polyurethane polyols and mixtures thereof.

As specific polyester polyols there may be mentioned polyester polyols obtained by reaction of, for example, dibasic acids such as terephthalic acid, isophthalic acid, adipic acid, azelaic acid and sebacic acid, or their dialkyl esters or mixtures thereof, with for example, glycols such as ethylene glycol, propylene glycol, diethylene glycol, butylene glycol, neopentyl glycol, 1,6-hexaneglycol, 3-methyl-1,5-pentanediol, 3,3'-dimethylolheptane, polyoxyethylene glycol, polyoxypropylene glycol and polytetramethylene ether glycol, or their mixtures, and polyester polyols obtained, for example, by ring-opening polymerization of lactones such as polycaprolactone, polyvalerolactone and poly(β-methyl-γ-valerolactone).

As specific polyether polyols there may be mentioned polyether polyols obtained by polymerization of, for example, oxirane compounds such as ethylene oxide, propylene oxide, butylene oxide or tetrahydrofuran using, for example, water or a low molecular weight polyol such as ethylene glycol, propylene glycol, trimethylolpropane or glycerin as the initiator.

As specific polyether ester polyols there may be mentioned polyether ester polyols obtained by reaction of, for example, dibasic acids such as terephthalic acid, isophthalic acid, adipic acid, azelaic acid and sebacic acid, or their dialkyl esters or mixtures thereof, with the aforementioned polyether polyols.

As specific polyesteramide polyols there may be mentioned those obtained by reaction of an amino group-containing aliphatic diamine such as ethylenediamine, propylenediamine or hexamethylenediamine as a starting material in addition to the starting materials for the polyesterification reaction product, during the aforementioned polyesterification reaction.

As specific acryl polyols there may be mentioned those obtained by copolymerization of a polymerizable monomer with one or more hydroxyl groups in the molecule, such as hydroxyethyl acrylate, hydroxypropyl acrylate or hydroxybutyl acrylate, or its corresponding methacrylic acid derivative, with, for example, acrylic acid, methacrylic acid or an ester thereof.

As specific polycarbonate polyols there may be mentioned those obtained by reacting, for example, one or more different glycols selected from the group consisting of ethylene glycol, propylene glycol, 1,3-propanediol, 1,4-butanediol, 1,5-pentanediol, 1,6-hexanediol, 1,9-nonanediol, 1,8-nonanediol, neopentylglycol, diethyleneglycol, dipropyleneglycol, 1,4-cyclohexanediol, 1,4-cyclohexanedimethanol and bisphenol A, with dimethyl carbonate, diphenyl carbonate, ethylene carbonate, phosgene or the like.

As specific polyhydroxyalkanes there may be mentioned polyisoprene, polybutadiene and liquid rubbers obtained by copolymerization of butadiene and acrylamide.

As specific polyurethane polyols there may be mentioned polyols with a urethane bond in each molecule, wherein the polyol is obtained by reaction with a compound with at least two isocyanate groups per molecule as described later, for example a polyether polyol, polyester polyol or polyether ester polyol with a molecular weight of 200–5000, to less than 1, and preferably no greater than 0.9 moles of (NCO groups/OH groups).

In addition to the polyols mentioned above, there may be included low molecular weight polyols with a molecular weight of 62–200. As specific examples of such low molecular weight polyols there may be mentioned glycols used in the production of polyester polyols, such as ethylene glycol, propylene glycol, 1,3-propanediol, 1,4-butanediol, 1,5-pentanediol, 1,6-hexanediol, 1,9-nonanediol, 1,8-nonanediol, neopentylglycol, 2-methylpentanediol, 3-methylpentanediol, 3,3-dimethylolheptane, 2,2,4-trimethyl-1,3-pentanediol, 2,4-diethyl-1,5-pentanediol, diethyleneglycol, dipropyleneglycol, 1,4-cyclohexanediol and 1,4-cyclohexanedimethanol, as well as compounds such as glycerin, trimethylolpropane and pentaerythritol.

Any of these compounds with different active hydrogen groups may be used, but in order to achieve alkali solubility, polyester polyols and polyurethane polyols composed of polyester polyols are preferred. For alkali solubility at low temperatures such as room temperature, there are preferred polyester polyols obtained by reacting ethylene glycol with an aliphatic dibasic acid such as adipic acid, azelaic acid or sebacic acid, or its dialkyl ester or a mixture thereof.

Compounds having at least two isocyanate groups per molecule will now be explained.

As compounds with at least two isocyanate groups per molecule to be used for the invention there may be mentioned polyisocyanate monomers, including aliphatic diisocyanates, for example, trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate and 2,6-diisocyanatemethyl caproate; alicyclic diisocyanates, for example, 1,3-cyclopentane diisocyanate, 1,4-cyclohexane diisocyanate, 1,3-cyclohexane diisocyanate, 3-isocyanatemethyl-3,5,5-trimethylcyclohexyl isocyanate, 4,4'-methylenebis(cyclohexylisocyanate), methyl-2,4-cyclohexane diisocyanate, methyl-2,6-cyclohexane diisocyanate, 1,4-bis(isocyanatemethyl)cyclohexane, 1,3-bis(isocyanatemethyl)cyclohexane and norbornane diisocyanate; aromatic diisocyanates, for example, m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate or mixtures thereof, 4,4'-toluidine diisocyanate, dianisidine diisocyanate and 4,4'-diphenylether diisocyanate; aromatic/aliphatic diisocyanates, for example, 1,3- or 1,4-xylylene diisocyanate or mixtures thereof, ω,ω'-diisocyanate-1,4-diethylbenzene and 1,3- or 1,4-bis(1-isocyanate-1-methylethyl)benzene or mixtures thereof; triisocyanates, for example, triphenylmethane-4,4',4''-triisocyanate, 1,3,5-triisocyanatebenzene, 2,4,6-triisocyanatetoluene and 1,3,5-triisocyanatehexane; tetraisocyanates, for example, 4,4'-diphenyldimethylethane-2,2'-5,5'-tetraisocyanate; as well as dimers, trimers, biurets, allophanates, carbodiimides derived from these polyisocyanate monomers; polyisocyanates with 2,4,6-oxadiazinetrione rings obtained from carbon dioxide gas and these polyisocyanate monomers; and addition products of low molecular weight polyols of molecular weight less than 200 such as, for example, ethylene glycol, propylene glycol, butylene glycol, 1,6-hexaneglycol, neopentylglycol, 3-methyl-1,5-pentanediol, 3,3'-dimethylolheptane, cyclohexanedimethanol, diethyleneglycol, triethyleneglycol, dipropyleneglycol, glycerol, trimethylolpropane, pentaerythritol and sorbitol, to the aforementioned polyisocyanate monomers.

Any of these compounds with different isocyanate groups may be used, but aromatic, aromatic/aliphatic or aliphatic isocyanate compounds are preferred in order to achieve satisfactory working properties.

In the aqueous polyurethane composition of the invention, a hydrophilic group is introduced or a surfactant is added to the polyurethane prepolymer for dissolution or dispersion of the polyurethane prepolymer in water.

For introduction of a hydrophilic group into the polyurethane prepolymer, for example, at least one type of compound having at least one active hydrogen group in the molecule and containing a hydrophilic group such as a carboxyl, sulfonic acid, sulfonate, epoxy or polyoxyethylene group, may be copolymerized during production of the polyurethane prepolymer.

As hydrophilic group-containing compounds there may be mentioned sulfonic acid-containing compounds such as, for example, 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, 2,4-diaminotoluene-5-sulfonic acid and their derivatives, as well as polyester polyols obtained by copolymerization thereof; carboxyl group-containing compounds such as, for example, 2,2-dimethylolpropionic acid, 2,2-dimethylolbutyric acid, 2,2-dimethylolvaleric acid, dioxymaleic acid, 2,6-dioxybenzoic acid, 3,4-diaminobenzoic acid and their derivatives, as well as polyester polyols obtained by copolymerization thereof; carboxyl group-containing compounds obtained by reaction of compounds with anhydrous groups such as maleic anhydride, phthalic anhydride, succinic anhydride, trimellitic anhydride and pyromellitic anhydride with compounds having active hydrogen groups, as well as derivatives thereof; and nonionic group-containing compounds such as polyethylene-polyalkylene copolymers of molecular weight 300–10,000 containing at least 3 wt % of repeating ethylene oxide units and containing at least one active hydrogen group in the polymer, as well as polyether ester polyols obtained by copolymerization thereof. For the copolymerization, these hydrophilic group-containing compounds may be used alone or in combinations of two or more.

A surfactant may also be used for further improved aqueous solubility or dispersability of the hydrophilic group-containing polyurethane prepolymer, or for dissolution or dispersion in water of a polyurethane prepolymer containing no hydrophilic group in the molecule.

As surfactants there may be used nonionic surfactants such as polyoxyethylene nonylphenyl ether or polyoxyethylene-oxypropylene block copolymer, or anionic surfactants such as sodium lauryl sulfate or sodium dodecylbenzenesulfonate.

However, soap-free types containing no surfactants are preferred from the standpoint of performance including adhesion to steel sheets, and in particular there are preferred aqueous polyurethane compositions containing carboxylic group-containing compounds and/or sulfonic acid groups.

In order to achieve a satisfactory stripping property at room temperature, there are preferred aqueous polyurethane compositions containing carboxyl groups and/or sulfonic acid groups, or their salts, to an acid value of 25–180.

When anionic groups such as carboxylate groups or sulfonate groups are used as hydrophilic groups in the aqueous polyurethane composition, a neutralizing agent may be used for satisfactory dissolution or dispersion in water.

As examples of neutralizing agents to be used for neutralization there may be mentioned basic substances including tertiary amines such as ammonia, triethylamine, triethanolamine, triisopropanolamine, trimethylamine and dimethylethanolamine, and hydroxides of alkali metals such as sodium hydroxide and potassium hydroxide. These may be used alone or in mixtures of two or more, but in order to achieve a satisfactory stripping property with alkali stripping agents, it is preferred to use sodium hydroxide and/or potassium hydroxide.

The method of adding the neutralizing agent may be direct addition to the polyurethane prepolymer, or addition to the water during dissolution or dispersion in water. The amount of neutralizing agent added is 0.1–2.0 equivalents, and more preferably 0.3–1.3 equivalents, with respect to the hydrophilic groups.

An organic solvent may be used during synthesis of the polyurethane prepolymer. When used, the organic solvent may specifically be, for example, acetone, methyl ethyl ketone, ethyl acetate, acetonitrile or N-methylpyrrolidone. The amount of the organic solvent with respect to the reaction starting materials is preferably about 3–50 wt %.

The polyurethane prepolymer is dissolved or dispersed in water using a homogenizer, mixer or the like. The temperature is preferably from room temperature to about 70° C. to prevent evaporation of the basic substances neutralizing the hydrophilic groups and to ensure handleability. The concentration of the aqueous polyurethane composition when dispersed in a medium such as water is preferably 10–50 wt %, in order to avoid excessively increasing the viscosity and to maintain the shelf-life.

Reaction with other chain extenders can give higher molecular weights. The chain extenders used may be publicly known polyamine compounds or the like. As examples of polyamine compounds there may be mentioned diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3-dimethyl-4,4'-dicyclohexylmethanediamine and 1,4-cyclohexanediamine; polyamines such as diethylenetriamine, dipropylenetriamine, triethylenetetramine and tetraethylenepentamine; compounds with amino groups and hydroxyl groups, such as hydroxyethyl hydrazine, hydroxyethyl diethylenetriamine, 2-[(2-aminoethyl)amino]ethanol and 3-aminopropanediol; as well as hydrazines and acid hydrazines. These polyamine compounds may be used alone or in mixtures of two or more.

A polyurethane emulsion according to the invention may also, if necessary, contain an added film-forming aid for the purpose of improving the coating formability.

As specific examples of film-forming aids there may be mentioned alcohols such as methyl alcohol, ethyl alcohol, n-propyl alcohol, isopropyl alcohol, n-butyl alcohol, isobutyl alcohol, hexyl alcohol, octyl alcohol and 2,2,4-trimethyl-1,3-pentanediol monoisobutyrate; ethers such as cellosolve, ethyl cellosolve, butyl cellosolve, diethyleneglycol monoxthylether, diethyleneglycol monobutylether, propyleneglycol monoethylether, propyleneglycol monobutylether, dipropyleneglycol monoethylether, dipropyleneglycol monobutylether, dipropyleneglycol monoisobutylether, tripropyleneglycol monoethylether, tripropyleneglycol monobutylether and tripropyleneglycol monoisobutylether; and glycol ether esters such as butylcellosolve acetate, diethyleneglycol monobutylether acetate, dipropyleneglycol monobutylether acetate, tripropyleneglycol monobutylether acetate and tripropyleneglycol monoisobutylether acetate. These adjuvant solvents may also be used alone or in mixtures of two or more, as necessary.

The lubricating functionality-providing agent will now be explained.

The lubricating functionality-providing agent has the function of further contributing to the lubricity by lowering the surface friction coefficient, and preventing scratching for improved press workability and wipe working properties. The lubricating functionality-providing agent may be any one which provides lubrication for the resulting film, but preferred are one or more types from among polyolefin-based agents (polyethylene, polypropylene, etc.), fluorine-based agents (polytetrafluoroethylene, polychlorotrifluoroethylene, polyvinylidene fluoride, polyvinyl fluoride, etc.), paraffin-based agents and stearic acid-based waxes.

The mean particle size for a granular lubricating functionality-providing agent is no greater than 5 μm. At greater than 5 μm the continuity and uniformity of the film is lost, the cohesion with the ground layer and the coating adhesion are reduced and peeling of the agent with the lubricating function occurs, while the shelf-life of the coating composition is also reduced. A more preferred mean particle size for the lubricating functionality-providing agent is in the range of 0.5–4 μm.

The amount of the lubricating functionality-providing agent added is preferably 1–30 wt % with respect to the solid content of the aqueous polyurethane composition. At less than 1% the required lubricating effect cannot be obtained. At greater than 30 wt % problems may occur such as reduced film strength and peeling of the agent with the lubricating function. A more preferred content for the agent with the lubricating function is in the range of 5–20 wt %.

In the alkali-soluble lubricating film-forming coating composition of the invention, silica (C) is added to improve the film strength and the cohesion with the steel sheet. Silica particles may be any type of silica particles including water-dispersible colloidal silica, crushed silica and vapor phase silica. In consideration of the film workability and corrosion resistance, the primary particle size is preferably 2–30 nm and the secondary aggregate particle size is preferably no greater than 100 nm.

The amount of silica added is preferably 1–30 wt % with respect to the solid content of the aqueous polyurethane composition. At less than 1% a sufficient effect of improvement in corrosion resistance may not be obtained and sufficient adhesion may not be exhibited with the ground layer. At greater than 30%, extension of the film will be reduced, tending to lower the workability and produce scratching.

The lubricating resin film of the invention may also contain, in addition to components (A, A'), (B) and (C), also added pigments for decorative design, or conductive additives to confer conductivity, as well as thickeners, defoaming agents, dispersing agents, desiccators, stabilizers, anti-skinning agents, anti-fungal agents, preservatives, freeze proofing agents and the like depending on the purpose and within a range that does not impair the properties of the resin.

The thickness of the lubricating resin film of the invention is preferably in the range of 0.5–5 μm. If the thickness is less than 0.5 μm it may not be possible to prevent scratches produced by pressure during working from reaching the plating layer, and the required workability may not be achieved for sliding. At 5 μm or more, a greater amount of coat peeling powder will be released during shaping thus making more frequent die care necessary, and therefore the productivity will be compromised. The lubricating resin film of the invention may be coated on either or both sides of a metal plate, as necessary.

The method of forming the lubricating resin film of the invention may include coating by a conventional publicly known method for polyurethane coating compositions, such as roll coater coating, wringer roll coating, spray coating, bar coater coating, air knife draw coating, immersion coating, brush coating or the like, followed by drying and baking in a metal sheet carry-over temperature range of 40–200° C. during a drying step in a hot air furnace, induction heating furnace, infrared furnace or the like.

According to the invention, the ground layer may be further subjected to phosphate treatment or chromate treatment to achieve better corrosion resistance or adhesion. The chromating treatment in this case may be electrolytic chromating, reactive chromating or application chromating treatment. The chromate film is preferably one formed by coating and drying a chromate solution containing one or more from among silica, phosphoric acid and hydrophilic resins.

The phosphate coverage is preferably in the range of 0.5–3.5 g/m$^2$ in terms of the phosphate. The chromate coverage is preferably in the range of 5–150 mg/m$^2$ and more preferably 10–50 mg/m$^2$ in terms of metallic chromium. At less than 5 mg/m$^2$ it will not be possible to obtain an excellent corrosion resistance effect, and at greater than 150 mg/m$^2$ the workability during shaping may be impaired by aggregate destruction of the chromate film, etc.

Depending on the purpose, the ground layer may also be subjected to acid washing treatment, alkali treatment, electrolytic reduction treatment, cobalt plating treatment, nickel plating treatment, silane coupling treatment or inorganic silicate treatment.

Metal articles that are suitable for application of the present invention include zinc-based electroplated, hot-dip plated and vapor deposition plated steel sheets, such as zinc-plated steel sheets, zinc/nickel-plated steel sheets, zinc/iron-plated steel sheets, zinc/chromium-plated steel sheets, zinc/aluminum-plated steel sheets, zinc/titanium-plated steel sheets, zinc/magnesium-plated steel sheets and zinc/manganese-plated steel sheets; aluminum- or aluminum alloy-plated steel sheets; lead- or lead alloy-plated steel sheets; tin- or tin alloy-plated steel sheets; as well as these plated layers containing trace amounts of different metal elements or containing cobalt, molybdenum, tungsten, nickel, titanium, chromium, aluminum, manganese, iron, magnesium, lead, antimony, tin, copper, cadmium, arsenic or the like as impurities; and/or those with an inorganic substance such as silica, alumina, titania or the like dispersed therein. There may also be applied composite layer platings comprising combinations of the aforementioned platings with other types of platings, such as iron plating or iron/phosphorus plating.

There may also be used stainless steel sheets, cold-rolled steel sheets, hot-rolled steel sheets, zinc sheets, zinc alloy sheets, aluminum sheets, aluminum alloy sheets and the like.

The steel sheet on which the lubricating film of the invention is formed may be further coated with a lubricating oil or lubricating rust preventive oil. However, a lubricating oil or lubricating rust preventive oil that is coated is preferably one that does not cause expansion of dissolution of the lubricating film of the invention.

The metal article such as a steel sheet on which the lubricating film of the invention has been formed is then subjected to shape working including press working, deep drawing, wipe working, roll forming, etc. Even under such severe conditions of shape working, metal articles such as steel sheets on which lubricating films of the invention have been formed exhibit adequate shapeability and lubricating properties due to the shape working resistance of the polyurethane and the lubricating action of the lubricating functionality-providing agent, and are therefore resistant to metal surface scratching, scratching, etc.

After shape working of a metal article on which a lubricating film of the invention has been formed in this manner, the lubricating film of the metal article may be alkali-treated for removal.

Figure 2:
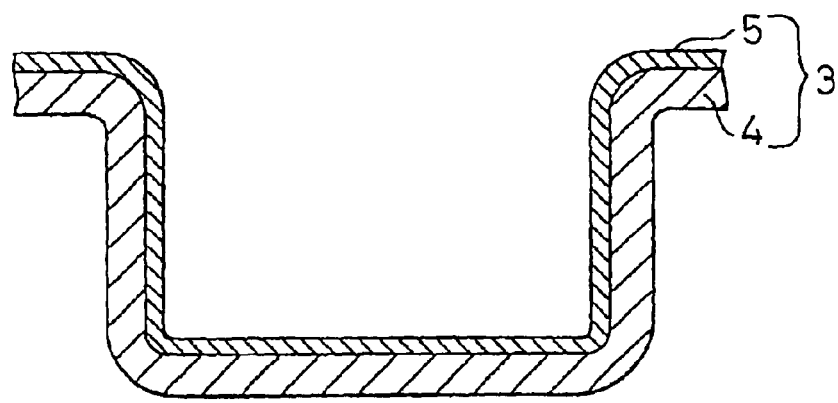
Figure 3:
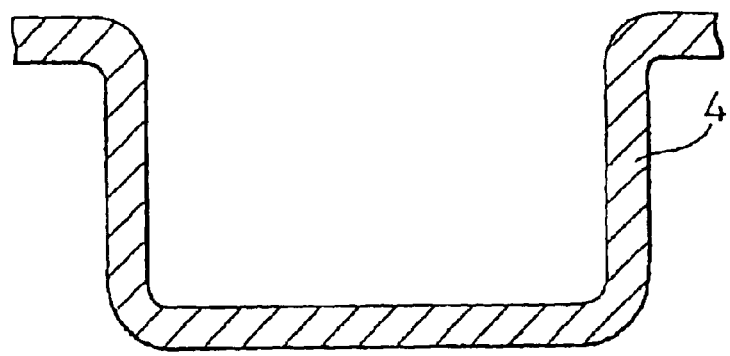

The condition of metal after lubricating film formation, shape working and lubricating film removal, where an alkali-soluble lubricating film-forming coating composition according to the invention has been used, will now be explained, with reference to FIGS. 1 to 3. A steel sheet 1 is coated with an alkali-soluble lubricating film-forming coating composition of the invention to form a lubricating film 2 (FIG. 1). The steel sheet 1 on which the lubricating film 2 has been formed is, for example, worked by deep drawing to obtain a molded product 3. The molded product comprises a steel sheet 4 and a lubricating film 5, and no scratches or scratching are seen in the steel sheet 4 (FIG. 2). After shape working, the metal product 3 is treated with an alkali solution by immersion or spraying to remove the lubricating film 5, thus obtaining a metal product 4 as the final product (FIG. 3).

EXAMPLES

The present invention will now be further illustrated by way of examples.

1. Test Samples
(1) Metal Sheet Types

The following metal sheets were used for coating of lubricating films according to the invention.

Zinc-electroplated steel sheet
(sheet thickness: 0.8 mm, plating coverage: 20 g/m$^2$)
Zinc/nickel alloy-electroplated steel sheet
(sheet thickness: 0.8 mm, plating coverage: 20 g/m$^2$)
zinc/iron alloy-electroplated steel sheet
(sheet thickness: 0.8 mm, plating coverage: 20 g/m$^2$)
zinc hot-dip plated steel sheet
(sheet thickness: 0.8 mm, plating coverage: 150 g/m$^2$)
zinc/iron alloy hot-dip plated steel sheet
(sheet thickness: 0.8 mm, plating coverage: 45 g/m$^2$)
zinc/aluminum alloy hot-dip plated steel sheet
(sheet thickness: 0.8 mm, plating coverage: 150 g/m$^2$)
Aluminum/silicon hot-dip plated steel sheet
(sheet thickness: 0.8 mm, plating coverage: 50 g/m$^2$)
Aluminum/silicon/magnesium hot-dip plated steel sheet
(sheet thickness: 0.8 mm, plating coverage: 50 g/m$^2$)
Stainless steel sheet
(sheet thickness: 0.8 mm, SUS430, 2B finishing)
Aluminum alloy sheet (sheet thickness: 0.8 mm)
Cold-rolled steel sheet (sheet thickness: 0.8 mm)

(2) Chromating Treatment

A roll coater was used to coat the above plated steel sheets with a coating chromate solution containing colloidal silica added to chromic acid with a chromium reduction rate (Cr(VI)/total Cr) of 0.4, to a chromium coverage of 20 mg/m$^2$ in terms of metallic chromium, and the plated steel sheets were heated and dried to form chromate films. The stainless steel sheet, aluminum alloy sheet and cold-rolled sheet were not chromate treated.

2. Production of Aqueous Polyurethane Composition

Production Example 1

To a four-necked flask equipped with a stirrer, Dimroth condenser, nitrogen introduction tube, silica gel drying tube and thermometer there were added 137.32 g of 3-isocyanatemethyl-3,5,5-trimethylcyclohexyl isocyanate, 42.21 g of dimethylolpropionic acid, 9.46 g of triethylene glycol, 126.01 g of a polyester polyol of molecular weight 2000 comprising adipic acid and ethylene glycol, and 135.00 g of ethyl acetate as a solvent, and after heating to 75° C. in a nitrogen atmosphere, 0.05 g of dibutyltin dilaurate was further added thereto and mixed therewith for 5 hours, after which attainment of the prescribed number of amino equivalents was confirmed, to obtain an ethyl acetate solution of a polyurethane prepolymer. A Homodisper was used to disperse 402.86 g of this polyurethane prepolymer ethyl acetate solution in an aqueous solution obtained by dissolving 11.28 g of sodium hydroxide in 650.00 g of water, for emulsification, and then 6.72 g of hydrazine monohydrate diluted with 50.00 g of water was added for chain extension reaction, and the ethyl acetate used for synthesis of the polyurethane prepolymer was distilled off under reduced pressure of 150 mmHg at 50° C., to obtain polyurethane emulsion A containing substantially no solvent and having a solid content of 30% and a viscosity of 100 cps.

Production Example 2

To a four-necked flask equipped with a stirrer, Dimroth condenser, nitrogen introduction tube, silica gel drying tube and thermometer there were added 107.28 g of 1,3-bis (isocyanatemethyl)cyclohexane, 21.96 g of dimethylolpropionic acid, 14.23 g of neopentyl glycol, 136.54 g of a polyester polyol of molecular weight 2000 comprising adipic acid and ethylene glycol, and 120.00 g of N-methylpyrrolidone as a solvent, and after heating to 70° C. in a nitrogen atmosphere and stirring for 5 hours, attainment of the prescribed number of amino equivalents was confirmed, to obtain an N-methylpyrrolidone solution of a polyurethane prepolymer. A Homodisper was used to disperse 375.96 g of this polyurethane prepolymer solution in an aqueous solution obtained by dissolving 29.46 g of triisopropanolamine in 537.21 g of water, for emulsification, and then 7.37 g of hydrazine monohydrate diluted with 50.00 g of water was added for chain extension reaction, to obtain polyurethane emulsion B having a solid content of 30% and a viscosity of 50 cps.

Production Example 3

To a four-necked flask equipped with a stirrer, Dimroth condenser, nitrogen introduction tube, silica gel drying tube and thermometer there were added 101.91 g of 1,3-bis (isocyanatemethyl)cyclohexane, 20.86 g of dimethylolpropionic acid, 13.52 g of neopentyl glycol, 129.71 g of a polycarbonate diol of molecular weight 2000 and 114.00 g of acetonitrile as a solvent, and after heating to 70° C. in a nitrogen atmosphere and stirring for 5 hours, attainment of the prescribed number of amino equivalents was confirmed, to obtain an acetonitrile solution of a polyurethane prepolymer. A Homodisper was used to disperse 377.82 g of this polyurethane prepolymer solution in an aqueous solution obtained by dissolving 28.12 g of triisopropanolamine in 630 g of water, for emulsification, and then 7.41 g of hydrazine monohydrate diluted with 70.00 g of water was added for chain extension reaction, and the acetonitrile used for synthesis of the polyurethane prepolymer was distilled off under reduced pressure of 150 mmHg at 50° C., to obtain polyurethane emulsion C containing substantially no solvent and having a solid content of 30% and a viscosity of 20 cps.

Production Example 4

To a four-necked flask equipped with a stirrer, Dimroth condenser, nitrogen introduction tube, silica gel drying tube and thermometer there were added 87.11 g of 3-isocyanatemethyl-3,5,5-trimethylcyclohexyl isocyanate, 31.88 g of 1,3-bis(1-isocyanate-1-methylethyl)benzene, 41.66 g of dimethylolpropionic acid, 4.67 g of triethylene glycol, 62.17 g of a polyester polyol of molecular weight 2000 comprising adipic acid, neopentyl glycol and 1,6- hexanediol, and 122.50 g of acetonitrile as a solvent, and after heating to 70° C. in a nitrogen atmosphere and stirring for 4 hours, attainment of the prescribed number of amino equivalents was confirmed, to obtain an acetonitrile solution of a polyurethane prepolymer. A Homodisper was used to disperse 346.71 g of this polyurethane prepolymer solution in an aqueous solution obtained by dissolving 12.32 g of sodium hydroxide in 639.12 g of water, for emulsification, and then 12.32 g of 2-[(2-aminoethyl)amino]ethanol diluted with 110.88 g of water was added to the polyurethane emulsion for chain extension reaction, and the acetonitrile used for synthesis of the polyurethane prepolymer was distilled off under reduced pressure of 150 mmHg at 50° C., to obtain polyurethane emulsion D containing substantially no solvent and having a solid content of 25% and a viscosity of 30 cps.

Production Example 5

To a four-necked flask equipped with a stirrer, Dimroth condenser, nitrogen introduction tube, silica gel drying tube and thermometer there were added 87.11 g of 3-isocyanatemethyl-3,5,5-trimethylcyclohexyl isocyanate, 31.88 g of 1,3-bis(1-isocyanate-1-methylethyl)benzene, 41.66 g of dimethylolpropionic acid, 4.67 g of triethylene glycol, 62.17 g of a polyester polyol of molecular weight 2000 comprising adipic acid and ethylene glycol, and 122.50 g of acetonitrile as a solvent, and after heating to 70° C. in a nitrogen atmosphere and stirring for 4 hours, attainment of the prescribed number of amino equivalents was confirmed, to obtain an acetonitrile solution of a polyurethane prepolymer. A Homodisper was used to disperse 341.12 g of this polyurethane prepolymer solution in an aqueous solution obtained by dissolving 16.15 g of potassium hydroxide in 640.92 g of water, for emulsification, and then 12.12 g of 2-[(2-aminoethyl)amino]ethanol diluted with 109.08 g of water was added to the polyurethane emulsion for chain extension reaction, and the acetonitrile used for synthesis of the polyurethane prepolymer was distilled off under reduced pressure of 150 mmHg at 50° C., to obtain polyurethane emulsion E containing substantially no solvent and having a solid content of 25% and a viscosity of 30 cps.

3. Fabrication of Lubrication Surface Treated Metal Articles

Example 1

Aqueous polyurethane composition obtained in

| Aqueous polyurethane composition obtained in | |
| --- | --- |
| Production Example 1 | 500 pts. by wt. |
| Solid lubricant (Note 1) | 37 pts. by wt. (10*) |
| Silica (Note 2) | 75 pts. by wt. (10*) |

*amount with respect to 100 as the urethane resin solid content (Note 1) Solid Lubricant Low-density type polyethylene wax resin with softening point: 110° C., mean particle size: 2.5 μm, solid content: 40%

(Note 2) Silica

Colloidal silica with mean particle size: 10–20 nm, pH 8.6, heated residue: approximately 20%.

Lubricating films with the structures described above and the compositional ratios listed in Tables 1 and 2 were coated onto the aforementioned metal sheets with a bar coater, and a heating furnace at 180° C. was used for film formation by baking and drying at a metal sheet carry over temperature of 80° C.

Examples 1–27 and Comparative Examples 1–4 (Table 1), or Examples 1–29 and Comparative Examples 1–3 (Table 2)

Lubricating surface treated metal articles were fabricated in the same manner as Example 1, except that the metal sheets and lubricating film compositions were combined as shown in Tables 1 and 2. An acrylic resin was evaluated in the same manner as a comparison resin material.

The following tests and performance evaluations were conducted with these samples.

4. Testing and Evaluation Methods (1) Die Scratching Evaluation

A molding test was carried out under the conditions given below using a cylindrical punch hydraulic molding tester, and the die scratching was evaluated.

| | |
| --- | --- |
| punch diameter: 70 mmΦ | blank diameter: 150 mm |
| press load: 5 kgf/cm$^2$ | molding speed 3.3x 10$^{-2}$ m/s |
| tool conditions: FCD-500 | |

All of the samples were molded to 80% of the maximum molding height. The evaluation of the die scratching was based on the following scale.

◎: shapeable, with no steel sheet surface defects

○: shapeable, with no steel sheet surface defects but slight coloration of sliding surface Δ: shapeable, with some scratching flaws on steel sheet surface x: shapeable, with considerable linear scratching flaws on steel sheet surface The condition of resin scrap production after working was evaluated on the following scale.

◎: no scrap production

○: very slight resin scrap production

Δ: some resin scrap production x: considerable resin scrap production (2) Degreasing Property Evaluation An FC-4358 degreasing solution (pH adjusted to 10.5, temperature: 70° C., product of Nihon Parkerizing) was sprayed onto a test piece for 8 seconds and then rinsed, and after drying, the film residue rate was measured by infrared spectrophotometry and evaluated.

◎: no film residue

○: no greater than 5% film residue

Δ: greater than 5% and no greater than 10% film residue x: greater than 10% film residue As shown in Tables 1 and 2, all of the lubricating surface treated metal articles according to the invention had excellent die scratching properties, low production of scrap after working and satisfactory film removal rates by alkali degreasing.

Industrial Applicability

According to the present invention there may be provided a coating composition allowing formation of alkali-soluble lubricating films with excellent press molding properties and scratch resistance, and lubricating surface treated metal articles employing it, which are expected to offer a notable contribution for uses of steel sheets that are subjected to alkali degreasing after shaping. The present invention may therefore be said to have a very high industrial value.

TABLE 1

Evaluation results

| No. | Metal sheet type | Chromate coverage (mg/m$^2$) | Urethane resin type | PE Wax A Amount added (%) | PE Wax B Amount added (%) | PTFE Wax Amount added (%) | Paraffin Wax Amount added (%) | Ca stearate wax Amount added (%) | Silica Amount added (%) | Film thickness (μm) | Die scratching property evaluation results | Condition of post-working scrap production | Degreasing property evaluation (film residue after alkali degreasing) | Reference |
|---|---|---|---|---|---|---|---|---|---|---|---|---|---|---|
| 1 | Zinc electroplated steel | 20 | resin A | 10 | | | | | 10 | 1.0 | ◎ | ◎ | ◎ | Examples |
| 2 | Zinc/nickel alloy electroplated steel | 20 | resin A | 10 | | | | | 10 | 1.0 | ◎ | ◎ | ◎ | |
| 3 | Zinc/iron alloy electroplated steel | 20 | resin A | 10 | | | | | 10 | 1.0 | ◎ | ◎ | ◎ | |
| 4 | Zinc hot-dip plated steel | 20 | resin A | 10 | | | | | 10 | 1.0 | ◎ | ◎ | ◎ | |
| 5 | Zinc/aluminum alloy hot-dip plated steel | 20 | resin A | 10 | | | | | 10 | 1.0 | ◎ | ◎ | ◎ | |
| 6 | Zinc/iron alloy hot-dip plated steel | 20 | resin A | 10 | | | | | 10 | 1.0 | ◎ | ◎ | ◎ | |
| 7 | Aluminum/silicon alloy hot-dip plated steel | 20 | resin A | 10 | | | | | 10 | 1.0 | ◎ | ◎ | ◎ | |
| 8 | Aluminum/silicon/magnesium alloy hot-dip plated steel | 20 | resin A | 10 | | | | | 10 | 1.0 | ◎ | ◎ | ◎ | |
| 9 | Aluminum/silicon alloy hot-dip plated steel | 20 | resin A | | | 10 | | | 10 | 1.0 | ◎ | ◎ | ◎ | |
| 10 | Aluminum/silicon alloy hot-dip plated steel | 20 | resin A | | | | 10 | | 10 | 1.0 | ◎ | ◎ | ◎ | |
| 11 | Aluminum/silicon alloy hot-dip plated steel | 20 | resin A | | | | | 10 | 10 | 1.0 | ◎ | ◎ | ◎ | |
| 12 | Aluminum/silicon alloy hot-dip plated steel | 20 | resin A | 10 | | | | | 10 | 2.0 | ◎ | ◎ | ◎ | |
| 13 | Aluminum/silicon alloy hot-dip plated steel | 20 | resin A | 10 | | | | | 10 | 3.0 | ◎ | ◎ | ◎ | |
| 14 | Aluminum/silicon alloy hot-dip plated steel | 20 | resin A | 10 | | | | | 10 | 5.0 | ◎ | ◎ | ◎ | |
| 15 | Aluminum/silicon alloy hot-dip plated steel | 20 | resin A | 5 | | | | | 10 | 1.0 | ◎ | ◎ | ◎ | |
| 16 | Aluminum/silicon alloy hot-dip plated steel | 20 | resin A | 25 | | | | | 10 | 1.0 | ◎ | ◎ | ◎ | |
| 17 | Aluminum/silicon alloy hot- | 20 | resin A | | 10 | | | | 10 | 1.0 | ◎ | ◎ | ◎ | |

TABLE 1-continued

| | | | | Solid lubricant type and compositional ratio | | | | | | | Evaluation results | | | |
|---|---|---|---|---|---|---|---|---|---|---|---|---|---|---|
| No. | Metal sheet type | Chromate coverage (mg/m²) | Urethane resin type | PE Wax A Amount added (%) | PE Wax B Amount added (%) | PTFE Wax Amount added (%) | Paraffin Wax Amount added (%) | Ca stearate wax Amount added (%) | Silica Amount added (%) | Film thickness (μm) | Die scratching property evaluation results | Condition of post-working scrap production | Degreasing property evaluation (film residue after alkali degreasing) | Reference |
| 18 | Aluminum/silicon alloy hot-dip plated steel | 20 | resin B | 10 | | | | | 10 | 1.0 | ◎ | ◎ | ◎ | |
| 19 | Aluminum/silicon alloy hot-dip plated steel | 20 | resin C | 10 | | | | | 10 | 1.0 | ◎ | ◎ | ○ | |
| 20 | Stainless steel | untreated | resin A | 10 | | | | | 10 | 1.0 | ◎ | ◎ | ◎ | |
| 21 | Stainless steel | untreated | resin A | | | 10 | | | 10 | 1.0 | ◎ | ◎ | ◎ | |
| 22 | Stainless steel | untreated | resin A | | | | 10 | | 10 | 1.0 | ◎ | ◎ | ◎ | |
| 23 | Stainless steel | untreated | resin A | | | | | 10 | 10 | 1.0 | ◎ | ◎ | ◎ | |
| 24 | Stainless steel | untreated | resin A | 10 | | | | | 10 | 0.5 | ◎ | ◎ | ◎ | |
| 25 | Stainless steel | untreated | resin A | 10 | | | | | 10 | 3.0 | ◎ | ◎ | ◎ | |
| 26 | Stainless steel | untreated | resin B | 10 | | | | | 10 | 1.0 | ◎ | ◎ | ◎ | |
| 27 | Stainless steel | untreated | resin C | 10 | | | | | 10 | 1.0 | ◎ | ◎ | ○ | |
| 1 | Aluminum/silicon alloy hot-dip plated steel | 20 | resin F | 10 | | | | | 10 | 1.0 | △ | △ | △ | Comp. Ex. |
| 2 | Aluminum/silicon alloy hot-dip plated steel | 20 | resin A | 10 | | | | | 10 | 0.2 | × | × | ◎ | |
| 3 | Stainless steel | untreated | resin F | 10 | | | | | 10 | 1.0 | △ | △ | △ | |
| 4 | Stainless steel | untreated | resin F | 10 | | | | | 10 | 0.2 | × | × | ◎ | |

Resins
resin A polyurethane resin
resin B polyurethane resin
resin C polyurethane resin
resin F acrylic resin (comparison material)
Silica
Colloidal silica: mean particle size: 10–20 nm, pH 8.6, heating residue: approximately 20%
Solid lubricant types
PE wax A: low density polyethylene wax, softening point: 110° C., mean particle size: 4.0 μm
PE wax B: low density polyethylene wax, softening point: 110° C., mean particle size: 1.0 μm
PTFE wax: polytetrafluoroethylene wax, mean particle size: 3.5 μm
paraffin wax: synthetic paraffin wax, melting point: 105° C., mean particle size: 5.0 μm
calcium stearate wax: mean particle size: 2.0 μm

TABLE 2

| | | | | Solid lubricant type and compositional ratio | | | | | | | Evaluation results | | | |
|---|---|---|---|---|---|---|---|---|---|---|---|---|---|---|
| No. | Metal sheet type | Chromate coverage (mg/m²) | Urethane resin type | PE Wax A Amount added (%) | PE Wax B Amount added (%) | PTFE Wax Amount added (%) | Paraffin Wax Amount added (%) | Ca stearate wax Amount added (%) | Silica Amount added (%) | Film thickness (μm) | Die scratching property evaluation results | Condition of post-working scrap production | Degreasing property evaluation (film residue after alkali degreasing) | Reference |
| 28 | Zinc electroplated steel | 20 | resin D | 10 | | | | | 10 | 1.0 | ◎ | ◎ | ◎ | Examples |

TABLE 2-continued

Evaluation results

| No. | Metal sheet type | Chromate coverage (mg/m²) | Urethane resin type | Solid lubricant type and compositional ratio | | | | | Silica Amount added (%) | Film thickness (μm) | Die scratching property evaluation results | Condition of post-working scrap production | Degreasing property evaluation (film residue after alkali degreasing) | Reference |
|---|---|---|---|---|---|---|---|---|---|---|---|---|---|---|
| | | | | PE Wax A Amount added (%) | PE Wax B Amount added (%) | PTFE Wax Amount added (%) | Paraffin Wax Amount added (%) | Ca stearate wax Amount added (%) | | | | | | |
| 29 | Zinc/nickel alloy electroplated steel | 20 | resin D | 10 | | | | | 10 | 1.0 | ⊙ | ⊙ | ⊙ | |
| 30 | Zinc/iron alloy electroplated steel | 20 | resin D | 10 | | | | | 10 | 1.0 | ⊙ | ⊙ | ⊙ | |
| 31 | Zinc hot-dip plated steel | 20 | resin D | 10 | | | | | 10 | 1.0 | ⊙ | ⊙ | ⊙ | |
| 32 | Zinc/aluminum alloy hot-dip plated steel | 20 | resin D | 10 | | | | | 10 | 1.0 | ⊙ | ⊙ | ⊙ | |
| 33 | Zinc/iron alloy hot-dip plated steel | 20 | resin D | 10 | | | | | 10 | 1.0 | ⊙ | ⊙ | ⊙ | |
| 34 | Aluminum/silicon alloy hot-dip plated steel | 20 | resin D | 10 | | | | | 10 | 1.0 | ⊙ | ⊙ | ⊙ | |
| 35 | Aluminum/silicon/magnesium alloy hot-dip plated steel | 20 | resin D | 10 | | | | | 10 | 1.0 | ⊙ | ⊙ | ⊙ | |
| 36 | Aluminum/silicon alloy hot-dip plated steel | 20 | resin D | | | 10 | | | 10 | 1.0 | ⊙ | ⊙ | ⊙ | |
| 37 | Aluminum/silicon alloy hot-dip plated steel | 20 | resin D | | | | 10 | | 10 | 1.0 | ⊙ | ⊙ | ⊙ | |
| 38 | Aluminum/silicon alloy hot-dip plated steel | 20 | resin D | | | | | 10 | 10 | 1.0 | ⊙ | ⊙ | ⊙ | |
| 39 | Aluminum/silicon alloy hot-dip plated steel | 20 | resin D | 10 | | | | | 10 | 2.0 | ⊙ | ⊙ | ⊙ | |
| 40 | Aluminum/silicon alloy hot-dip plated steel | 20 | resin D | 10 | | | | | 10 | 3.0 | ⊙ | ⊙ | ⊙ | |
| 41 | Aluminum/silicon alloy hot-dip plated steel | 20 | resin D | 10 | | | | | 10 | 5.0 | ⊙ | ⊙ | ⊙ | |
| 42 | Aluminum/silicon alloy hot-dip plated steel | 20 | resin D | 5 | | | | | 10 | 1.0 | ⊙ | ⊙ | ⊙ | |
| 43 | Aluminum/silicon alloy hot-dip plated steel | 20 | resin D | 10 | | | | | 0 | 1.0 | ⊙ | ⊙ | ⊙ | |
| 44 | Aluminum/silicon alloy hot-dip plated steel | 20 | resin D | | 10 | | | | 10 | 1.0 | ⊙ | ⊙ | ⊙ | |
| 45 | Aluminum/silicon | 20 | resin E | 10 | | | | | 10 | 1.0 | ⊙ | ⊙ | ⊙ | |

TABLE 2-continued

Evaluation results

| No. | Metal sheet type | Chromate coverage (mg/m²) | Urethane resin type | PE Wax A Amount added (%) | PE Wax B Amount added (%) | PTFE Wax Amount added (%) | Paraffin Wax Amount added (%) | Ca stearate wax Amount added (%) | Silica Amount added (%) | Film thickness (μm) | Die scratching property evaluation results | Condition of post-working scrap production | Degreasing property evaluation (film residue after alkali degreasing) | Reference |
|---|---|---|---|---|---|---|---|---|---|---|---|---|---|---|
| | alloy hot-dip plated steel | | | | | | | | | | | | | |
| 46 | Stainless steel | untreated | resin D | 10 | | | | | 10 | 1.0 | ⊚ | ⊚ | ⊚ | |
| 47 | Stainless steel | untreated | resin D | | | 10 | | | 10 | 1.0 | ⊚ | ⊚ | ⊚ | |
| 48 | Stainless steel | untreated | resin D | | | | 10 | | 10 | 1.0 | ⊚ | ⊚ | ⊚ | |
| 49 | Stainless steel | untreated | resin D | | | | | 10 | 10 | 1.0 | ⊚ | ⊚ | ⊚ | |
| 50 | Stainless steel | untreated | resin D | 10 | | | | | 10 | 0.5 | ⊚ | ⊚ | ⊚ | |
| 51 | Stainless steel | untreated | resin D | 10 | | | | | 0 | 1.0 | ⊚ | ⊚ | ⊚ | |
| 52 | Stainless steel | untreated | resin E | 10 | | | | | 10 | 1.0 | ⊚ | ⊚ | ⊚ | |
| 53 | Aluminum alloy | untreated | resin A | 10 | | | | | 10 | 1.0 | ⊚ | ⊚ | ⊚ | |
| 54 | Aluminum alloy | untreated | resin D | 10 | | | | | 10 | 1.0 | ⊚ | ⊚ | ⊚ | |
| 55 | Cold-rolled steel | untreated | resin A | 10 | | | | | 10 | 1.0 | ⊚ | ⊚ | ⊚ | Comp. Ex. |
| 56 | Cold-rolled steel | untreated | resin D | 10 | | | | | 10 | 1.0 | ⊚ | ⊚ | ⊚ | |
| 5 | Aluminum alloy | untreated | resin F | 10 | | | | | 10 | 1.0 | Δ | Δ | Δ | |
| 6 | Cold-rolled steel | untreated | resin F | 10 | | | | | 10 | 1.0 | Δ | Δ | Δ | |
| 7 | Cold-rolled steel | untreated | resin D | 10 | | | | | 10 | 0.2 | x | x | ⊚ | |

Resins
resin D polyurethane resin
resin E polyurethane resin
resin F acrylic resin (comparison material)
Silica
Colloidal silica: mean particle size: 10–20 nm, pH 8.6, heating residue: approximately 20%
Solid lubricant types
PE wax A: low density polyethylene wax, softening point: 110° C., mean particle size: 4.0 μm
PE wax B: low density polyethylene wax, softening point: 110° C., mean particle size: 1.0 μm
PTFE wax: polytetrafluoroethylene wax, mean particle size: 3.5 μm
paraffin wax: synthetic paraffin wax, melting point: 105° C., mean particle size: 5.0 μm
calcium stearate wax: mean particle size: 2.0 μm

What is claimed is:

1. A coating composition capable of forming an alkali-soluble lubricating film, which contains an aqueous polyurethane composition (A) and a lubricating functionality-providing agent (B) at 1–30 wt % with respect to the solid content of said aqueous polyurethane composition, wherein said aqueous polyurethane composition is film-formable and its formed films are alkali-soluble.

2. A coating composition according to claim 1, which further contains silica particles (C) at 1–30 wt % with respect to the solid content of said aqueous polyurethane composition.

3. A coating composition according to claim 1, wherein the aqueous polyurethane composition (A) comprises a polyester polyol.

4. A coating composition according to claim 1, wherein the aqueous polyurethane composition (A) contains a carboxyl group or sulfonic acid group or salt thereof as a hydrophilic group.

5. A coating composition according to claim 4, wherein said hydrophilic group of the aqueous polyurethane composition (A) is a Na salt or K salt of a carboxyl group or sulfonic acid group.

6. A coating composition according to claim 5, wherein the carboxyl group or sulfonic acid group is contained in the aqueous polyurethane composition (A) to an acid value in the range of 25–180.

7. A coating composition according to claim 3, wherein the polyester polyol composing the aqueous polyurethane composition (A) is prepared by reacting ethylene glycol with an aliphatic dibasic acid or its dialkyl ester, or a mixture thereof.

8. A coating composition according to claim 1, wherein the lubricating functionality-providing agent (B) comprises one or more from among polyolefin-based waxes, fluorine-based waxes, paraffin-based waxes stearic acid-based waxes.

9. A lubricating surface treated metal article wherein a lubricating film comprising a polyurethane resin (A') and a lubricating functionality-providing agent (B) at 1–30 wt % with respect to said polyurethane resin, is formed on the surface of a metal article, wherein said lubricating film is alkali soluble and the film thickness is 0.5–5 μm.

10. A lubricating surface treated metal article according to claim 9, wherein said lubricating film contains silica particles (C) at 1–30 wt % with respect to said polyurethane resin.

11. A lubricating surface treated metal article according to claim 9, wherein the polyurethane resin (A') comprises a polyester polyol.

12. A lubricating surface treated metal article according to claim 9, wherein the polyurethane resin (A') contains a carboxyl group or sulfonic acid group or salt thereof as a hydrophilic group.

13. A lubricating surface treated metal article according to claim 12, wherein said hydrophilic group of the polyurethane resin (A') is a Na salt or K salt of a carboxyl group or sulfonic acid group.

14. A lubricating surface treated metal article according to claim 13, wherein the carboxyl group or sulfonic acid group is contained in the polyurethane resin (A') to an acid value in the range of 25–180.

15. A lubricating surface treated metal article according to claim 11, wherein the polyester polyol composing the polyurethane resin (A') is prepared by reacting ethylene glycol with an aliphatic dibasic acid or its dialkyl ester, or a mixture thereof.

16. A lubricating surface treated metal article according to claim 9, wherein the lubricating functionality-providing agent (B) comprises one or more from among polyolefin-based waxes, fluorine-based waxes, paraffin-based waxes and stearic acid-based waxes.

17. A process for production of metal articles that comprises
i) a step of coating the surface of a metal article with a coating composition containing an aqueous polyurethane composition (A) and a lubricating functionality-providing agent (B) at 1–30 wt % with respect to the solid content of said aqueous polyurethane composition (A), said aqueous polyurethane composition being film-formable and the formed film being alkali soluble, to form an alkali-soluble lubricating film,
ii) a step of shape working the metal article surface treated with said alkali-soluble lubricating film, and
iii) a step of treating said shape worked metal article with an alkali to remove said alkali-soluble lubricating film.

18. A process according to claim 17, wherein silica particles (C) are also included at 1–30 wt % with respect to the solid content of said aqueous polyurethane composition.

19. A process according to claim 17, wherein the aqueous polyurethane composition (A) comprises o polyester polyol.

20. A process according to claim 17, wherein the aqueous polyurethane composition (A) contains a carboxyl group or sulfonic acid group or salt thereof as a hydrophilic group.

21. A process according to claim 20, wherein said hydrophilic group of the aqueous polyurethane composition (A) is a Na salt or K salt of a carboxyl group or sulfonic acid group.

22. A process according to claim 21, wherein the carboxyl group or sulfonic acid group is contained in the aqueous polyurethane composition (A) to an acid value in the range of 25–180.

23. A process according to claim 19, wherein the polyester polyol composing the aqueous polyurethane composition (A) is prepared by reacting ethylene glycol with an aliphatic dibasic acid or its dialkyl ester, or a mixture thereof.

24. A process according to claim 17, wherein the lubricating functionality-providing agent (B) comprises one or more from among polyolefin-based waxes, fluorine-based waxes, paraffin-based waxes and stearic acid-based waxes.

* * * * *